Oct. 10, 1933.  R. T. CALLOWAY  1,930,305
ELECTRICAL TERMINAL DEVICE
Filed April 14, 1932  3 Sheets-Sheet 1
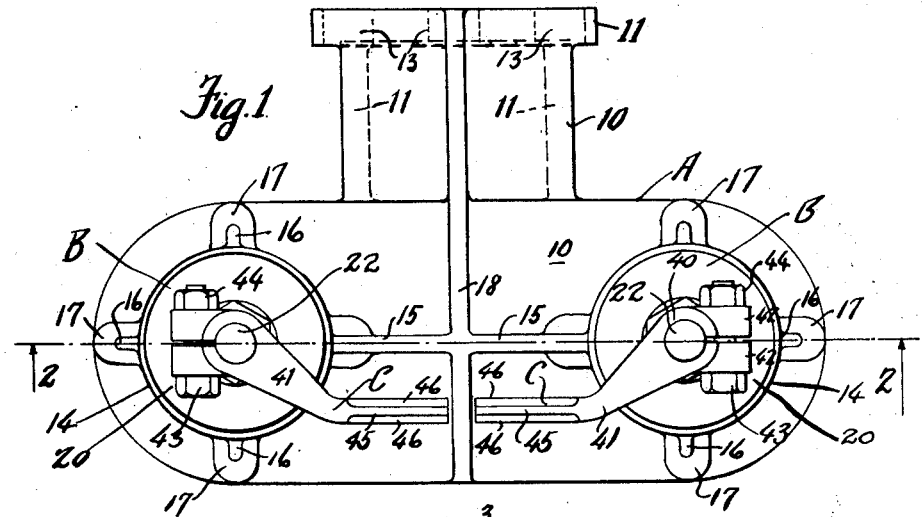
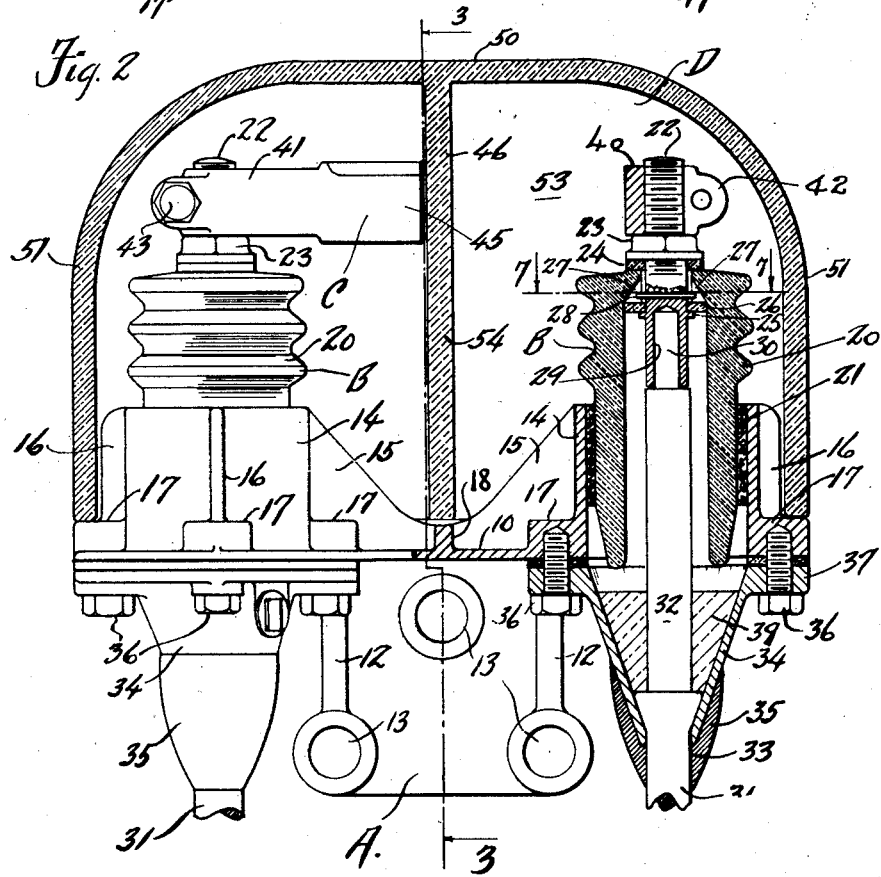
INVENTOR.
Russell T. Calloway
BY Thomas H. Ferguson
ATTORNEY.

Oct. 10, 1933.  R. T. CALLOWAY  1,930,305
ELECTRICAL TERMINAL DEVICE
Filed April 14, 1932  3 Sheets-Sheet 2
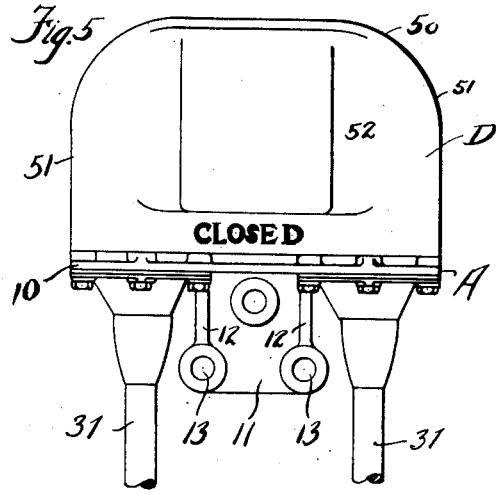
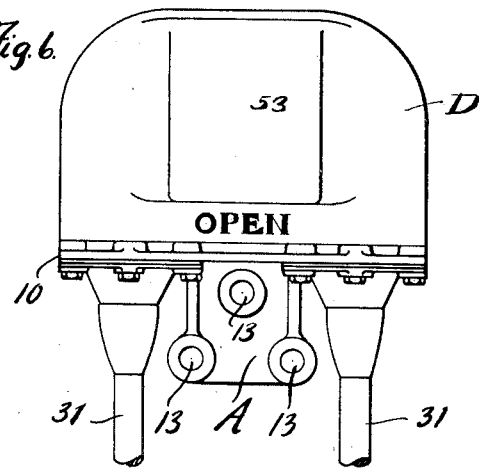
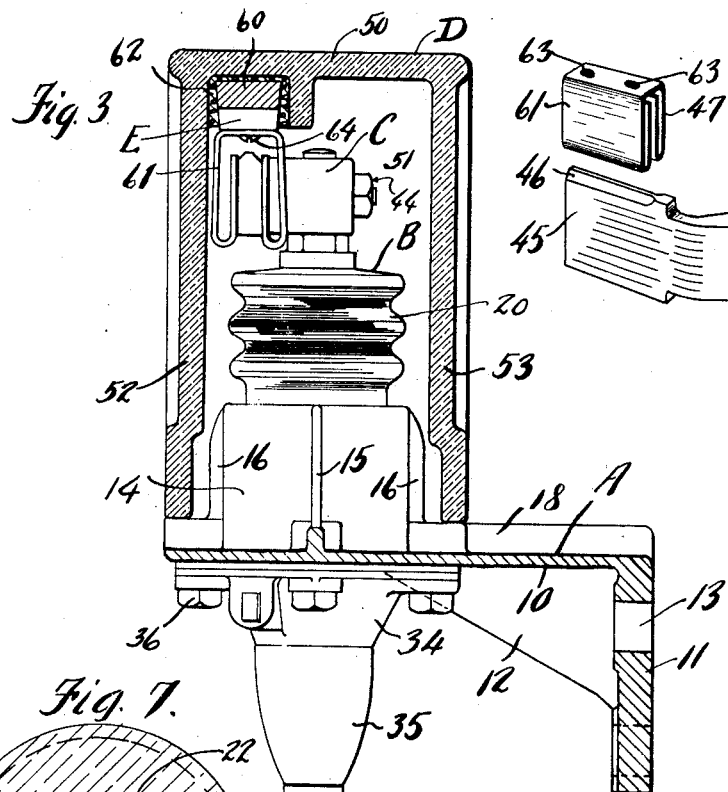
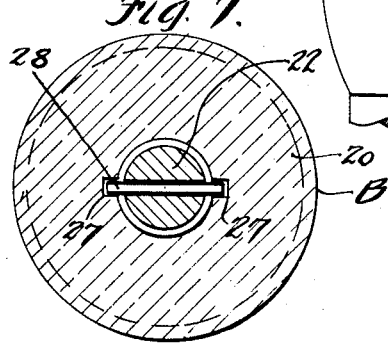
INVENTOR.
Russell T. Calloway
BY Thomas H. Ferguson
ATTORNEY Oct. 10, 1933.  R. T. CALLOWAY  1,930,305
ELECTRICAL TERMINAL DEVICE
Filed April 14, 1932  3 Sheets-Sheet 3
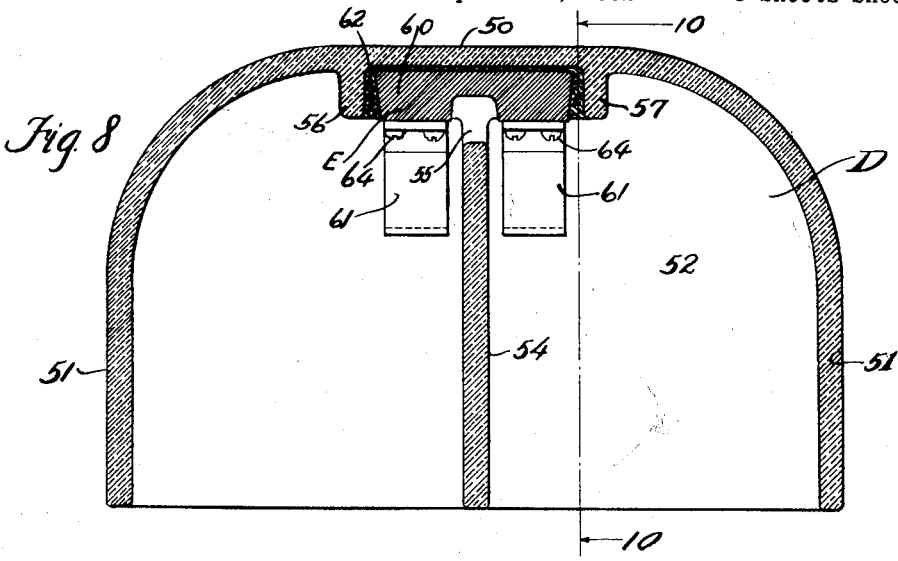
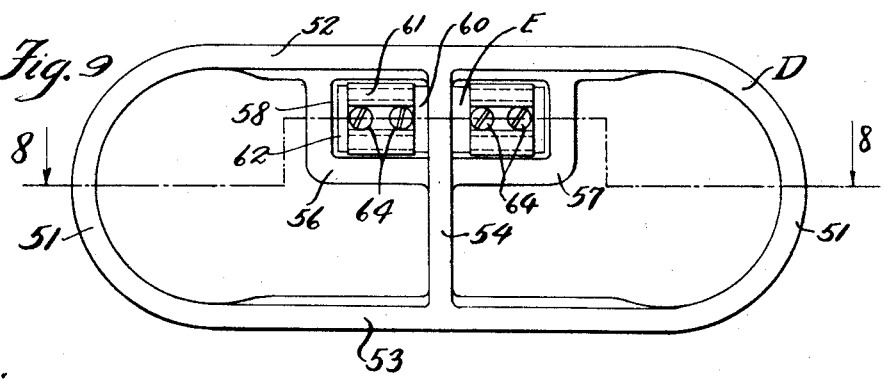
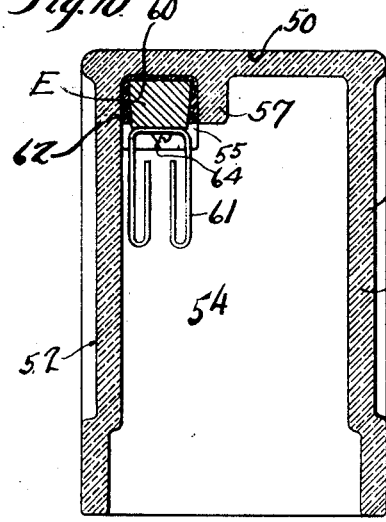
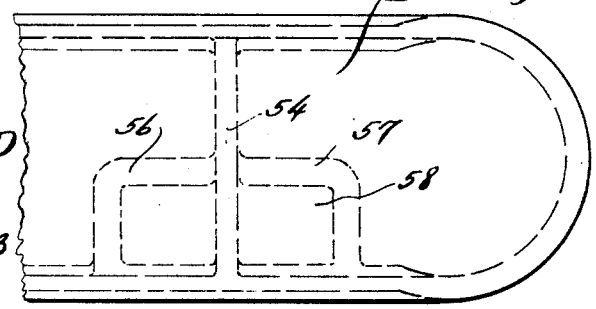
INVENTOR.
Russell T. Calloway
BY Thomas H. Ferguson
ATTORNEY Patented Oct. 10, 1933

1,930,305

UNITED STATES PATENT OFFICE 1,930,305

ELECTRICAL TERMINAL DEVICE

Russell T. Calloway, Glen Ellyn, Ill., assignor to Electrical Engineers Equipment Company, a corporation of Illinois Application April 14, 1932. Serial No. 605,257

8 Claims. (Cl. 173—353)

The present invention relates to electrical terminal devices of the class intended for the connection and disconnection of conductor terminals and finds, perhaps, its greatest usefulness as a junction box for cable ends. When used in this latter relation, it is sometimes called a cable end bell. It is as such that it will be described and illustrated, although it will be readily seen as the disclosure is proceeded with that many features of the invention are capable of use in other relations.

One object of the invention is to provide a bell type structure in which all electrical live parts will be enclosed in chambers of porcelain or other insulating material both when the device is in its fully connected position and when it is in its fully disconnected position.

Another object is to provide a device of the class described wherein it will be unnecessary to employ detached parts which are idle and useless in certain positions of the device, such as so called "dummies" and "dummy caps" heretofore used in certain cable end bells.

Another object is to provide a bell which will have certain positions for both closed and open circuit conditions and to employ markings which will positively and correctly indicate the electrical condition within the bell whenever the latter is properly seated on its base, whether that condition be a closed circuit condition or an open circuit one.

Another object is to provide a structure wherein an insulating barrier will be instantly brought between the live terminals as the circuit between them is being broken, the barrier, as it were, cutting the arc between the terminals.

Another object is to provide novel terminals and terminal mountings which will be most effective for the purposes intended.

These and other objects, features and advantages of the invention, will be more fully understood upon reference to the following detail description taken in connection with the accompanying drawings, while the scope of the invention will be particularly pointed out in the appended claims.

In said drawings, Fig. 1 is a plan view of an electrical terminal device constructed and arranged in accordance with the present invention, the cover being omitted; Fig. 2 is a central sectional elevation, the cover and one of the terminal mountings being shown in section, and the other terminal and its mounting being shown in elevation, the plane of section being indicated by the line 2—2 of Fig. 1; Fig. 3 is a transverse section viewing one of the terminals and its mounting in elevation, the plane of section being indicated by the line 3—3 of Fig. 2; Fig. 4 is a perspective view illustrating one of the terminal arms and a portion of the associated bridging contact, the same being slightly separated for clearness; Fig. 5 is a front elevation of the complete device with the cover set upon the base so as to bring the bridging contact into engagement with the terminal contacts, thus providing a closed circuit condition, as indicated by the word "closed" on the front of the cover; Fig. 6 is a similar view indicating the cover placed upon the base in such a way as to bring the bridging contact out of engagement with the terminal contacts, and thus provide an open circuit condition, indicated by the word "open", as shown; Fig. 7 is a transverse section through the upper end of one of the terminals and its support, the plane of section being indicated by the line 7—7 of Fig. 2; Fig. 8 is a broken longitudinal section through the cover, the plane of section being indicated by the line 8—8 of Fig. 9; Fig. 9 is a bottom plan view of the cover and shows the bridging contact within; Fig. 10 is a transverse section of the same cover, the plane of section being indicated by the line 10—10 of Fig. 8; and Fig. 11 is a fragmentary plan view of the same cover, the central partition and skirting around the bridging contact being shown in dotted lines. Throughout these views like characters refer to like parts.

The electrical terminal device illustrated consists essentially of a base A, electric terminal mountings B, electric terminals C extending through and supported by said mountings and extending laterally toward each other, a cover D which rests upon the base and encloses the terminals and their mountings, and a bridging contact E secured in the top of the cover and adapted in one setting of the bell to electrically connect the terminals, and in another setting of the bell to lie wholly out of engagement with them, the closed circuit condition being indicated by the word "closed" which stands at the front of the device when the circuit within the bell is closed, and the reverse or open circuit condition being indicated by the word "open" on the other side of the cover which stands at the front of the device when the circuit within the bell is open.

The base A comprises a flat horizontal portion 10 and a vertical portion 11 which are united by strengthening ribs 12. These parts form a substantial bracket or shelf upon which the mountings B may be located. The vertical portion 11 is provided with a plurality of holes 13 through which lag screws or bolts may be inserted for the purpose of securing the base, as a whole, to some suitable support. The shelf 10 of the base is provided with two upwardly extending sleeves 14 which are positioned near the opposite ends of the shelf 10 and are strengthened by lateral ribs 15, 16, which unite the same to the base. As clearly shown, the portion of the shelf 10 upon which the terminal mountings B are located, stands out from the vertical member 11 of the bracket so that the terminals are quite accessible from all sides, the shelf 10 being specially shaped for this purpose. The upper surface of the base 10 is provided with nubs or projections 17 which rise up about the mountings B in position to be engaged by the lower edge of the cover D when it is properly seated upon the base. Likewise the central rib 18 which extends along the base 10 outward from its bracket end is given a height equal to that of said nubs 17 so that the bottom edge of the cover also engages the upper face of the rib 18 at the forward and rear points where it crosses it. Obviously, the base A is composed of metal and is preferably cast with the various parts which we have been describing, upon it. In other words, the base A is a unitary metal structure.

The two mountings B which carry the terminals C, are the same in structure, and it will, therefore, suffice to describe one. One of the principal parts of each mounting B is a bell insulator 20 which has its lower end open and is positioned within the sleeve 14 are held therein by cement 21. The outer face of the bell insulator is corrugated so as to increase the creepage surface between the terminal C and the adjacent sleeve 14. The insulator 20 is preferably composed of porcelain, although the same might consist of any other suitable electrical insulating material. There is an opening through the upper portion of the insulator 20 and through this extends a terminal rod 22 which is threaded at its upper end for the reception of a retaining nut 23. The latter when screwed down upon the rod 22 presses against a gasket 24 which, in turn, engages the top surface of the insulator 20. The rod 22 is also provided with an annular projection 25, and the upper side of this projection engages a gasket 26, and the latter presses against the under side of the top wall of the insulator 20. Thus, when the nut 23 is screwed down upon the rod 22, the latter is firmly held and forms a tight connection with the insulator 20. A transverse pin 28 through the rod 20 serves to hold the latter against rotation, the ends of the pin engaging in slots 27 formed in the inner edges of the top wall of the insulator at diametrically opposite points. The gaskets 24, 26, may be composed of any suitable gasket material.

The lower end of the rod 22 is bored out so as to provide an axial opening 29 for the reception of the conductor 30 of an electrical cable 31. Besides the conducting wire or wires 30, the cable has an outer sheathing 32 of woven fabric, and then outward of this is a further covering 33 of metal, a lead sheathing being commonly employed for this purpose. As shown, the braiding 32 is cut back so as to free the end of the conductor 30 so that it may be properly inserted in the opening 29 and soldered or otherwise secured therein to provide good electrical contact. In turn, the lead sheathing 33 is cut away from the braiding 32 to a point well below the level of the shelf 10. Here it is spread out so as to fit tightly within a wiping sleeve 34. The sheathing 33 is further held to the wiping sleeve 34 by a lead wiped joint 35 which surrounds the cable and the wiping sleeve at their point of junction. The wiping sleeve 34 is suitably connected to the under side of the shelf 10 in proper alignment with the insulator 20. This connection may be made in any suitable way, as by means of the cap screws 36 which are passed through apertures in the rim 37 of the sleeve 34 and into threaded engagement with openings in the shelf 10 adjacent to the sleeve 14. In this way, the cable end is electrically connected to the terminal rod 22 and mechanically held in place in the base 10. Besides this the wiping sleeve 34 is preferably filled with a suitable insulating and water proof compound 39, the same being placed therein during the assembly of the parts.

The upper end of the rod 22 receives the hub 40 of the terminal arms 41. As clearly shown, the hub 40 is split and the wings 42 are pressed together by a bolt 43 and a cooperating nut 44. In this way a firm mechanical connection is established, and furthermore excellent electrical contact is made. As clearly shown, the arm 41 terminates at its outer end in a blade 45 which is slightly beveled at its upper edges 46 so as to readily enter between the spring arms of the associated clip 61 upon the bridging member E. As clearly shown, the blades 45 are in alignment with each other and adjacent to the forward side of the base 10, although, of course, well above the latter.

The hood or cover D is made large enough to enclose the terminals C and their mountings B. This cover is preferably composed of porcelain, although it may be constructed of any other suitable electrical insulating material. In plan, the bottom of the bell has the same outline as the periphery of the shelf 10. As clearly shown, its bottom edge occupies a single plane and, as before noted, this edge rests upon the nubs 17 and rib 18 of the shelf. This allows for a certain ventilation of the parts within the cover. The latter includes a relatively flat top 50, downwardly sloping ends 51, a front 52, and a back 53. Then, it is provided with a transverse partition or barrier 54 which extends from the bottom line of the cover to the top 50 except for a small opening 55 adjacent to the top 50 and the front wall 52. It is through this opening 55 that the bridging member E extends when the parts are fully assembled. The barrier 54 thus divides the interior of the hood D into two distinct compartments surrounded on the sides and above with insulation and having the small opening 55 as the only intercommunicating passage. Besides the transverse barrier 54, the interior of the cover is provided with walls or skirting 56, 57, which form a pocket 58 for the reception of the bridging member E. The cover D in service protects the contacts within from flooding by water in case the bell is in use in a manhole or other like place where water may accumulate about the device. In such case the rising water will compress the air entrapped within the cover and compress it. Finally the downward pressure of the air will balance the upward pressure of the water and the latter will rise no farther. This point in the design shown is intended to be near the top of the insulators 20 and quite below the exposed terminal parts.

The bridging member E consists of a bar 60 of copper or other good electrical conducting material, provided at its ends with spring clips 61 of similar good conducting material. The bridging member E is permanently located within the pocket 58 and is held therein by any suitable means, such as a cement filling 62. Preferably the side walls of the bar 60 converge downward and thus provide a dovetail bearing within the cement 62. This is for the purpose of insuring a firm mechanical connection at all times, even though there may be some expansion and contraction of the bar 60 due to its being heated by the current which passes through it when the device is in closed position. Each clip 61 is composed of a strip of conducting metal which has its ends turned inward and then the entire strip is bent into U shape so as to give the form shown. At its center it is provided with openings 63 through which screws 64 pass into threaded engagement with openings in the bar 60. The clips have their contact receiving opening extending lengthwise of the bar 60 and are thus in position to receive the blades 45 of the terminals C.

Since the bridging contact E is near the wall 52 of the bell cover, and since the clips C are forward of a central vertical plane through the supports B, it follows that the closed position of the device will be that wherein the wall 52 of the bell lies toward the front of the base A. This is the position illustrated in Fig. 3. It is therefore on the wall 52 that the word "closed" is placed. When the bell is removed from the base, the circuit will be open between the terminal clips C. During the upward movement of the bell cover, the partition 54 will pass between the ends of the clips and serve as a barrier to break any residual arc that might tend to persist. Although the device is not designed for breaking the circuit when it is carrying heavy loads, still if it were necessary in an emergency to break the circuit by removing the bell, the barrier would be of considerable benefit. Obviously, when the bell is replaced upon the shelf or base A with the wall 53 at the front of the base, then the clips 61 of the bridging contact member E will be on the far side of the central plane through the clip supports from the terminal blades 45 of the clips C. This will mean that the circuit is open. Therefore, the indication on the wall 53 of the cover D is the word "open." Thus, it will be noted, the condition of the bell and the electrical circuit within it can be determined at a glance, and it will be absolutely impossible to place the hood on the base in such a way as to get a wrong indication.

It will be noted that when the cover D is fully set upon the base A, whether in "closed" or "open" position, all the electrical parts are completely surrounded by electrical insulation, except for the distant metal parts of the base, and the electrical conductors which pass through it are thoroughly insulated from it.

One of the best features of my device is the complete elimination of dummies and dummy caps used on similar devices built heretofore. On these latter devices an additional bracket, often referred to as a "dummy," is supplied. Normally this dummy carried a porcelain hood called a "dummy cap". When it was desired to disconnect the terminals, the hood over the end bell was removed and the dummy cap put in its place. Then the bell hood was placed on the dummy. This required two operations and two extra pieces of equipment.

In carrying out my invention it will be apparent that certain changes and alterations may be made in the specific embodiment disclosed without departing from the spirit of the invention. I therefore aim to cover by the terms of the appended claims all those alterations and modifications which rightly come within the scope of the invention.

What is claimed,

1. An electrical terminal device comprising a base having two upwardly extending sleeves, bell insulators secured in said sleeves with their open ends downward, wiping sleeves secured to the under side of said base in line with said bell insulators, conductor cables leading up through said wiping sleeves, wiped joints between the outer sheaths of said cables and said wiping sleeves, connector terminals extending through openings in the upper ends of said bell insulators and mechanically secured thereto and electrically connected within said bell insulators to the conductors of said cables, terminal arms connected electrically and mechanically to said connector terminals and extending laterally therefrom toward each other, a main porcelain enclosing bell fitted to said base at its periphery and enclosing said terminal parts, a transverse partition in said bell dividing the same into terminal enclosing compartments and adapted to pass between the adjacent ends of said terminal arms, said partition having a transverse opening near its top, a conducting bridge bar extending through said opening, means for mechanically securing said bridge bar to said bell, and downwardly extending spring conductor clips at each end of said bridge bar secured to the same and adapted to be moved into and out of electrical engagement with the free ends of said terminal arms, said terminal arms, bridging bar and terminal clips being disposed to one side of a vertical plane through the centers of said bell insulators, whereby when said bell is set on said base with the electrical bridge bar on the same side of said plane as said terminal arms, circuit is completed between said terminal cables, and when said bell is set on said base with the electrical bridge bar on the opposite side of said plane from said terminal arms, circuit between said terminal cables is open, said bell having on its opposite sides markings which when read from the front of the base show the true electrical condition of the circuit within the bell.

2. An electrical terminal device comprising a base having two upwardly extending sleeves, bell insulators secured in said sleeves with their open ends downward, wiping sleeves secured to the under side of said base in line with said insulators, conductor cables leading up through said wiping sleeves, wiped joints between the outer sheath of said cables and said wiping sleeves, terminal members electrically connected to the ends of the conductors of said cables and extending upward through openings in the tops of said insulators and being mechanically supported thereby, terminal arms electrically and mechanically connected to said terminal members and extending toward each other, a removable enclosing bell of insulating material adapted to fit upon said base in two positions one hundred and eighty degrees apart, a transverse vertical partition in said bell adapted to extend between the adjacent ends of said terminal arms in both positions of said bell upon said base, said partition having a transverse opening through it, and a conducting bridge secured to said bell and extending through said opening and provided with ends adapted to engage said terminal arms to complete circuit therebetween when said bell is seated on said base in one of said positions and to lie at a distance from said terminal arms when said bell is seated on said base in the other of said positions.

3. An electrical terminal device comprising a base, insulators secured therein, conductors passing upward through said insulators and terminating in laterally extending arms approaching each other, a removable enclosing bell of insulating material adapted to fit upon said base in two positions one hundred and eighty degrees apart, a transverse vertical partition in said bell adapted to extend between said terminal arms in both positions of said bell on said base, said partition having a transverse opening through it, and a conducting bridge secured to said bell and extending through said opening and provided with ends adapted to engage said terminal arms to complete circuit therebetween when said bell is seated on said base in one of said positions and to lie at a distance from said terminal arms when said bell is seated on said base in the other of said positions.

4. An electrical terminal device comprising a base, insulators secured therein, conductors passing upward through said insulators and terminating in laterally extending arms approaching each other, a removable enclosing bell of insulating material adapted to fit upon said base in two positions one hundred and eighty degrees apart, a transverse vertical partition in said bell adapted to extend between said terminal arms in both positions of said bell on said base, said partition having a transverse opening through it, a conducting bridge member secured to said bell and operative in one of said positions of said bell to close circuit between said terminals and in the other of said positions to open the circuit, and a wall of insulating material extending downward from the top of said bell along the side of said bridge member transversely of said partition.

5. An electrical terminal device comprising a base, insulators secured therein, conductors passing upward through said insulators and terminating in laterally extending arms approaching each other, a removable enclosing bell of insulating material adapted to fit upon said base in two angularly displaced positions, a closed position and an open position, transverse partitioning means in said bell adapted to extend between said terminal arms in both said open and closed positions of said bell, said partitioning means being transversely apertured, and a bridging conductor member extending through said aperture and being operative to electrically connect said terminal arms in the closed position of said bell and to electrically disconnect said arms in the open position of said bell.

6. An electrical terminal device comprising a base, insulators secured therein, conductors passing upward through said insulators and terminating in laterally extending arms approaching each other, a removable enclosing bell of insulating material adapted to fit upon said base in two angularly displaced positions, a closed position and an open position, transverse partitioning means in said bell adapted to extend between said terminal arms in both said open and closed positions of said bell, said partitioning means being transversely apertured, a bridging conductor member extending through said aperture and being operative to electrically connect said terminal arms in the closed position of said bell and to electrically disconnect said arms in the open position of said bell, and a wall of insulating material extending downward from the top of said bell along the side and ends of said bridging conductor member to provide an insulating pocket in which said bridging member is secured.

7. An electrical terminal device comprising a base, insulators secured therein, conductors passing upward through said insulators and ending in fixed electrical terminals, a removable enclosing bell of insulating material adapted to fit upon said base in two angularly displaced positions, a closed position and an open position, transverse partitioning means in said bell adapted to extend between said fixed terminals in both said open and closed positions of said bell, said partitioning means being transversely apertured, and an electrical bridging member extending through said aperture and being operative to electrically connect said fixed terminals in the closed position of said bell and to disconnect the same in the open position of said bell.

8. An electrical terminal device comprising a base, insulators secured therein, conductors passing upward through said insulators and ending in fixed electrical terminals, a removable enclosing bell of insulating material adapted to fit upon said base in two angularly displaced positions, a closed position and an open position, transverse partitioning means in said bell adapted to extend between said fixed terminals in both said open and closed positions of said bell, said partitioning means being transversely apertured, an electrical bridging member extending through said aperture and being operative to electrically connect said fixed terminals in the closed position of said bell and to disconnect the same in the open position of said bell, and a wall of insulating material extending downward from the top of said bell along the side and ends of said bridging member to provide an insulating pocket in which said bridging member is secured.

RUSSELL T. CALLOWAY.